United States Patent [19]

Rosenberg

[11] 4,344,207
[45] Aug. 17, 1982

[54] APPARATUS FOR ALIGNING FISH

[75] Inventor: Harald Rosenberg, Lübeck, Fed. Rep. of Germany

[73] Assignee: Nordischer Maschinenbau Rud. Baader GmbH & Co. KG, Lübeck, Fed. Rep. of Germany

[21] Appl. No.: 243,378

[22] Filed: Mar. 13, 1981

[51] Int. Cl.³ .................... A22C 25/08; A22C 25/14
[52] U.S. Cl. ........................................... 17/63; 17/24
[58] Field of Search ................ 17/55, 60, 61, 63, 24

[56] References Cited

U.S. PATENT DOCUMENTS 2,955,316  10/1960  Danielsson ........................ 17/55 X

FOREIGN PATENT DOCUMENTS 1177783  9/1964  Fed. Rep. of Germany .......... 17/63
1292819  4/1969  Fed. Rep. of Germany .......... 17/63

Primary Examiner—Willie G. Abercrombie
Attorney, Agent, or Firm—Edward F. Levy

[57] ABSTRACT

An apparatus is disclosed for transferring fish processed or presented in a vertical attitude with their tail downwards into a longitudinally aligned position with regard to their head-tail attitude. The apparatus has a pair of horizontally guided conveyor belts which engage the flanks of the fish and below which a flap is arranged to be pivotable against the force of a spring about a transverse pivotal axis. The conveyor belts are resiliently supported by means of pressure rollers in the vicinity of the flap and extend parallel to one another up to these rollers, but diverge after these. A conveying surface is provided below the divergent section of the conveyor belts.

8 Claims, 4 Drawing Figures

APPARATUS FOR ALIGNING FISH

BACKGROUND OF THE INVENTION

1. Field of the Invention

The invention relates to an apparatus for aligning fish by transferring fish which are presented for conveying with their longitudinal axis in an approximately vertical orientation and their tail downwards into a horizontally aligned position with reference to their head-tail attitude including at least one pair of conveyor belts guided substantially parallel to one another, engaging the flanks of the fish and conveying these in a conveying direction extending substantially transverse to their longitudinal axis.

2. Description of Prior Art

When mechanically processing fish it has been found that, particularly with longitudinally orientated working steps, as for example when filleting, handling the fish in their swimming attitude, that is to say, in the head-tail attitude, results in the most favourable conditions for carryout out such working steps, whereas with transversely orientated working steps, as for example when decapitating, a vertical alignment, that is to say, head upwards and tail downwards, has shown itself to be advantageous. Coupling these working steps therefore requires a device with whose help the fish can be transferred from their vertical into their horizontal orientation. A typical decapitating device which processes fish in a vertical attitude is disclosed in German Pat. No. 11 77 783 in which the fish are conveyed by a pair of horizontally guided conveyor belts engaging the flanks of the head and of the rump whilst hanging and being supported at the lower edges of the gill flaps or the projection of the breast fins. After the decapitation the parts of the fish are cut free in such a way that the bodies or rumps fall out of the apparatus under the action of gravity. In this manner they can be fed to an oblique of inclined conveyor arranged below the decapitating device which lifts them up to the loading level of the subsequent processing machine and thus compensates for the loss of height which has occurred.

Furthermore, German Pat. No. 12 92 819 discloses a decapitating apparatus delivering the fish longitudinally orientated in which each fish is transported to the decapitating apparatus in an inclined disposition with its head downwards by means of three pairs of conveyor belts engaging it on its flanks. After the decapitation the fish rump is transported further merely by the central pair of conveyor belts and whilst being conveyed is rotated into a longitudinal position in which its decapitation surface is directed forwardly. By means of this apparatus fish of small to medium size can be further transported aligned with regard to their head-tail attitude, and additionally an alignment may be achieved with regard to their belly-back attitude if the fish are fed uniformly with reference to the position of their back or belly also. The processing of larger fish is, however, not possible with such an apparatus. In addition it is not ideal from the ergonomic point of view.

OBJECT OF THE INVENTION

It is an essential object of the invention to provide an apparatus which simply and whilst requiring the minimum space enables the transfer of even large processed fish hanging vertically aligned into a horizontal alignment.

SUMMARY OF THE INVENTION

To solve this object there is provided an apparatus for aligning fish by transferring fish which are presented for conveying with their longitudinal axis in an approximately vertical orientation and their tail downwards into a horizontally aligned position with reference to their head-tail attitude including at least one pair of conveyor belts guided substantially parallel to one another, engaging the flanks of the fish and conveying these in a conveying direction extending substantially transverse to their longitudinal axis, in which apparatus, in accordance with the invention, there is arranged a flap below the conveyor belts and in their plane of symmetry having its major surface arranged substantially transverse to this plane of symmetry, which flap extends into the pathway of the body or rump of the fish and is pivotable in the conveying direction about a pivotal axis extending transversely to the conveying direction against spring force, the conveyor belts immediately behind the flap in the conveying direction continuing divergingly whilst being resiliently supported.

The advantages which may be achieved thereby reside primarily in the fact that without a substantial change of level the fish may be brought along a short pathway out of e.g., a hanging head-tail attitude adopted for decapitation into their longitudinal attitude. The resiliently supporting diverging continuation of the conveyor belts results in an automatic adaptation to the size of the relevant fish in such a manner that its centre of gravity when the fish is released by the conveyor belts comes to lie on the other side of the flap which ensures its reliable turn-over into the longitudinal attitude.

For reaons of constructional simplicity in connection with the last mentioned advantageous feature, the conveyor belts immediately behind the flap in the conveying direction can be acted on by resiliently yieldable pressure rollers.

In order to achieve a correct guiding of the fish the flap is preferably arranged in its initial position approximately vertically and for the same purpose its side directed towards the rump of the fish can be constructed concavely.

The arrangement of a moved conveying surface immediately behind the flap in the conveying direction and approximately in the plane of its axis make possible the further conveying of the fish after its release by the conveyor belts which diverge in this region.

The conveyor belts can be provided with engagement means with which the fish is engaged positively or frictionally to convey it.

BRIEF DESCRIPTION OF THE DRAWINGS

Other and further objects of the present invention will be apparent from the following description and claims and are illustrated in the accompanying drawings which by way of illustration schematically show a preferred embodiment of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims.

In the drawings

DESCRIPTION OF THE PREFERRED EMBODIMENT

Figure 1:
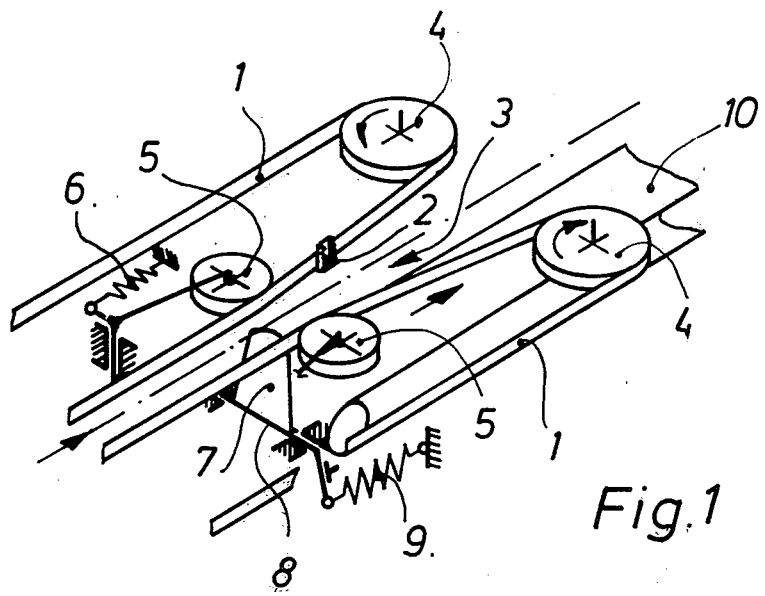
FIG. 1 is an axonometric view of part of an apparatus in accordance with the invention.

A pair of conveyor belts 1 provided with engagement means 2 and synchronously driven by suitable means are arranged on a machine frame, which is not shown. The conveyor belts are guided around rollers 4 of which only two are shown and are guided by means of pressure rollers 5 each of which is yieldable against the force of a spring 6 in such a manner that the parts of the conveyor belts 1 lying upstream of the pressure rollers 5 in the conveying direction extend parallel to one another and behind the pressure rollers 5 there is a diverging section 3. Directly in front of the pressure rollers 5 and below the plane of the conveyor belts 1 a flap 7 is arranged symmetrically with regard to the plane of symmetry of the apparatus and pivotably about a horizontal pivotal axis 8 extending transversely to the conveying direction against the force of a spring 9. The flap 7 extends up into the pathway of the rump rotation 12 of conveyed fish 11 and its surface directed towards the approaching fish 11 is of concave form in the direction of its longitudinal extent. Downstream of the flap 7 there is a conveying surface 10 moved in the conveying direction of the conveyor belts 1 and situated approximately in the plane of the pivotal axis 8.

Figures 2, 3, 4:
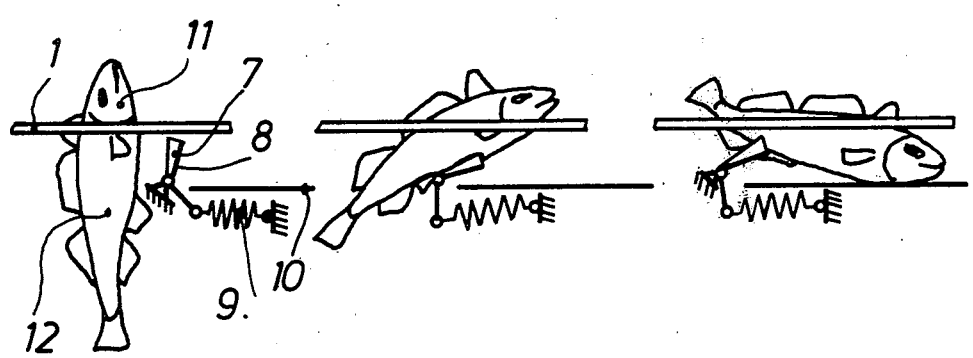
FIG. 2 is a scrap elevation of the apparatus in operation shortly before the arrival of a fish.
FIG. 3 is a view similar to FIG. 2 after the transfer into the longitudinal attitude has been commenced.
FIG. 4 is a view similar to FIG. 2 at the moment of completion of the transfer into the horizontal attitude.

The mode of operation of the apparatus is as follows:

A fish, processed in e.g., a decapitating machine and hanging with its tail downwards is conveyed out of the processing zone by means of the conveyor belts 1 engaging its flanks. Depending on how the fish 11 is presented, its rump portion 12 contacts the flap 7 with its belly or back and is guidingly supported by the concave surface of the flap. In the course of its further movement, the fish begins to leave its vertical attitude as a result of the retention effect of the flap 7 and the conveying engagement acting above the flap 7. The flap 7 tilts against the force of the spring 9 in dependence on the position of the rump portion 12 of the fish, and a relative movement between the flap 7 and the fish 11 begins which finally results in the fact that the centre of gravity of the fish that was originally in the vicinity of the flap 7 rises up above the latter. In the meantime, the fish has left the vicinity of the pressure rollers 5 and the conveying engagement of the conveyor belts which was previously firm begins to be loosened as a result of the divergence of the latter. This process continues until the fish 11 is released which results in the fish 11 which is now aligned nearly horizontally (see FIG. 3) coming onto the conveying surface 10 under the action of gravity. The tail portion of the fish, which is the first to be released by the conveyor belts 1 or was never even gripped due to its smaller thickness compared with that of the belly or head regions, is thus pushed upwardly by the flap 7 by virtue of the force exerted by the spring 9 so that the fish 11 always achieves the desired horizontal attitude (see FIG. 4). The flap 7, the pressure rollers 5 and the angle of divergence of the conveyor belts 1 are so dimensioned and arranged with respect to one another that the release of the fish always occurs regardless of its length or width only when its centre of gravity has taken up a position which ensures a reliable changeover into the horizontal attitude. The automatic adaptability of the apparatus to differing sizes of fish is thus due to the fact that a larger or thicker fish is always released later than a smaller or thinner one.

What is claimed is:

1. Apparatus for aligning fish, said fish having a head end, a tail end, flanks, a rump portion intermediate said head end and said tail end and a longitudinal axis extending between said head end and said tail end, said apparatus including two first conveying means, said two first conveying means being adapted to engage said flanks of said fish and thereby to convey said fish in a conveying direction essentially transverse to said longitudinal axis with said longitudinal axis of said fish extending substantially vertically and said tail end lowermost, said apparatus further including a pivotable flap, and a biasing means connected to said pivotable flap, said flap being positioned below said first conveying means and extending upwards to point where, in use, it is engaged by said rump portion of said fish, said flap being pivotable in said conveying direction about a pivotal axis extending transverse to said conveying direction by engagement of said flap with said rump portion of said fish against a force exerted by said biasing means, said two first conveying means extending substantially parallel to one another up to said flap but diverging downstream of said flap in said conveying direction, resilient support means being associated with the divergent portions of said two first conveying means.

2. Apparatus as claimed in claim 1 wherein said resilient support means comprises two yieldable pressure rollers, each of said pressure rollers engaging said one of said two first conveying means at points immediately downstream of said flap in said conveying direction.

3. Apparatus as claimed in claim 1 wherein said biasing means is adapted to return said flap to a starting position in which it extends substantially vertically.

4. Apparatus as claimed in any one of claims 1 to 3 wherein said flap has a surface adapted to engage said rear portion of said fish, said surface being concave.

5. Apparaus as claimed in any one of claims 1 to 3 including second conveying means arranged immediately behind said flap in said conveying direction, said second conveying means having a surface lying in substantially the same plane as said pivotal axis of said flap.

6. Apparatus as claimed in claim 1 wherein said two first conveying means comprise conveyor belts, said conveyor belts being provided with projecting engagement means adapted to engage said flanks of said fish.

7. Apparatus as claimed in claim 6 wherein said engagement means engage said fish positively.

8. Apparatus as claimed in claim 6 wherein said engagement means engage said fish frictionally.

* * * * *